O. C. FRICK.
COMMINUTING ATTACHMENT FOR FEED CUTTERS.
APPLICATION FILED AUG. 22, 1913.

1,157,095.

Patented Oct. 19, 1915.

UNITED STATES PATENT OFFICE.

ORLANDO C. FRICK, OF MANITOWOC, WISCONSIN, ASSIGNOR TO SMALLEY MANUFACTURING CO., OF MANITOWOC, WISCONSIN, A CORPORATION OF WISCONSIN.

COMMINUTING ATTACHMENT FOR FEED-CUTTERS.

1,157,095.

Specification of Letters Patent.

Patented Oct. 19, 1915.

Application filed August 22, 1913. Serial No. 786,079.

*To all whom it may concern:*

Be it known that I, ORLANDO C. FRICK, a citizen of the United States, residing at Manitowoc, county of Manitowoc, and State of Wisconsin, have invented new and useful Improvements in Comminuting Attachments for Feed-Cutters, of which the following is a specification.

My invention relates to improvements in comminuting attachments for feed cutters.

The object of my invention is to provide improved means for comminuting the material delivered from a feed cutter, with especial reference to the preparation of clover and alfalfa for stock and poultry feeding purposes.

Figure 1:
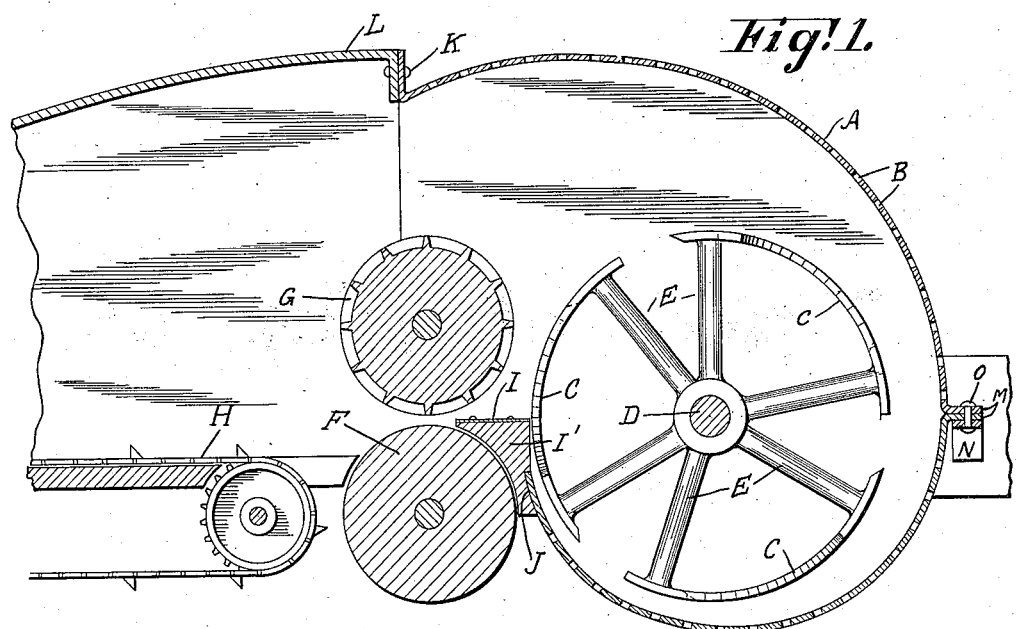
Figure 2:
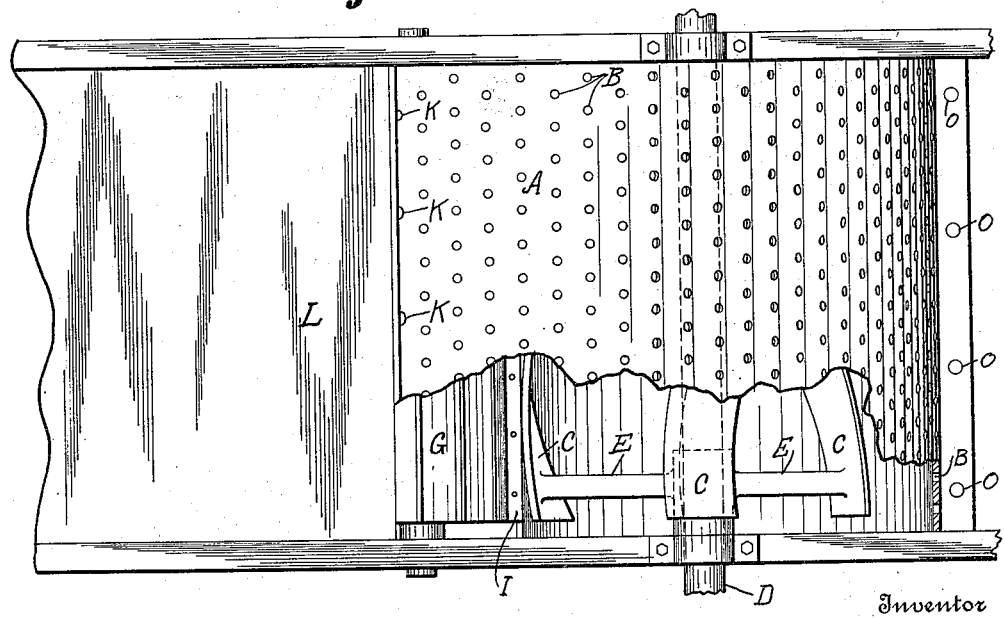

In the drawings—Figure 1 is a sectional view of the rear portion of a feed cutter equipped with my improved attachment. Fig. 2 is a plan view of the same with the comminuting screen partially broken away to show its relation to the cutter blades and feed rollers.

Like parts are indentified by the same reference characters in both views.

Attempts have heretofore been made to provide means for comminuting clover and alfalfa by partially surrounding the feed cutting blades with a screen arranged concentrically to the axis above which the blades revolve, with a view of having the blades force the material through the openings in the screen as fast as such material is worked up by the blades and cut or pulverized sufficiently to pass through the screen openings. Experiments which I have conducted, however, show that with the screen thus concentrically arranged, there is a strong tendency to clog the feed cutter, and in any case, a large portion of the material is carried around uselessly without being either broken or cut by the blades and that considerable time is therefore required to properly pulverize or comminute the material. This necessitates a very slow operation of the machine to prevent clogging and entails considerable expense in operation. I have discovered, however, that by inclosing the cutting blades on the delivery side with a spirally curved screen which approaches closely to a circle described by the blades immediately below the shear bar and diverges from the path of the blades in a spiral curve extending downwardly and rearwardly, and then upwardly at the rear side of the blades, and forwardly over the blades with progressive deflection from said circle, the material may be rapidly comminuted and delivered through the screen.

I preferably employ a sheet metal screen A through which holes B are punched, the walls of the holes or openings B being straight sided and affording comparatively sharp edges, whereby any straws which partially pass through said holes will be broken off by the pressure of the material which is being carried around by the knives. Owing to the spiral curve of the screen, the space between the screen and the knives constantly increases in area in the direction of knife travel, thus allowing the material to loosen up and permitting the individual pieces to turn end over end and mix. This facilitates the discharge of such portions of the material as have been sufficiently comminuted, and also increases the tendency of the longer pieces to catch in the holes B and be broken, as above explained.

In the drawings a portion of a feed cutter is illustrated, in which knives C are employed which are supported from a driving shaft D by arms E in an ordinary manner. F and G are feed rollers, H is a feeding conveyer, and I is a shear bar. All of these parts may be of ordinary construction, but I preferably provide the lower portion of the shear bar or its supporting block I' with a recess J, to which one margin of the screen A may be connected. The screen extends from this line of connection in a spiral curve, as above stated, around the circle described by the knives to a point above the feed roller G, whereby it is secured at K to the frame or housing wall L. The screen A is preferably formed in section with outturned flanges M, which are secured together and attached to a supporting cross bar N by bolts or rivets O. This is done in order to provide the screen with a strengthening rib, whereby the lower portion of the screen may be adequately supported under the heavy pressure to which it is subjected.

The increased space in the upper portion of the screen is of little value in itself for the purpose of facilitating the rapid comminution of the material, for the reason that if the material is held in a compact mass for any considerable distance after passing the shear bar, it will not loosen up above the knives in a manner to pass upwardly through the screen, but will tend to form a cake or comparatively solid mass of semi-pulverized material which loosens up only partially and tends to fill and clog the space above the knives. In my improved attachment, however, it is not possible for the material to become massed or caked, since the gap between the screen and the knives is constantly increasing in dimensions directly underneath the knives where the fresh material cut from above the shear bar is being constantly forced. A considerable portion of the material will therefore be comminuted and forced through the screen along the under side without being carried around the knives at all. The delivery of such a quantity of material also provides additional space for that remaining and the remaining material being coarse and left in a loose condition, maximum opportunity is afforded for the ends to get caught in the holes B and broken.

The principal object of that portion of the screen above the cross bar N, therefore, is to prevent delivery of the coarse material and allow it to be carried around over the knives and downwardly between the knives and the feed roller G or to the shear bar I. A portion of it may also be thrown forwardly over the feed roller G to the conveyer H, which again delivers it between the feed rollers to the knives.

I claim—

1. The combination with a feed cutter provided with a shear bar and rotary cutting knives, of a screen having one margin supported in close proximity to the knives underneath the shear bar, said screen extending from such supporting margin downwardly and rearwardly, and then upwardly in a spiral curve, following, but continuously diverging from the circle described by the knives, said screen being provided with apertures through which comminuted material may pass.

2. The combination with a feed cutter provided with a shear bar and rotary cutting knives, of a screen having one margin supported in close proximity to the knives underneath the shear bar, said screen extending from such supported margin downwardly and rearwardly, and then upwardly and forwardly over the knives in a spiral curve, following, but continuously diverging from the circle described by the knives, said screen being provided with apertures through which comminuted material may pass, and the upper margin of said screen being supported above and in front of the knives, the lower and rear portions of said screen being in sufficiently close proximity to the knives to permit the material to be carried along its surface by the knives into progressively widening space.

3. The combination with a feed cutter provided with a shear bar and rotary cutting knives, of a screen having one margin supported in close proximity to the knives underneath the shear bar, said screen extending from such supported margin downwardly and rearwardly and then upwardly in a spiral curve, continuously diverging from the circle described by the knives, said screen comprising a piece of sheet metal having perforations, the walls of which are straight and form sharp angles with the interior surface of the screen to facilitate breaking and pulverizing such material as may catch in the perforations, the lower and rear portions of said screen being in sufficiently close proximity to the knives to permit the material to be carried along its surface by the knives into progressively widening space.

In testimony whereof I affix my signature in the presence of two witnesses.

ORLANDO C. FRICK.

Witnesses:
A. L. HOUGEN,
C. E. BRADY.

Copies of this patent may be obtained for five cents each, by addressing the "Commissioner of Patents, Washington, D. C."